(12) United States Patent
Sandholzer et al.

(10) Patent No.: US 9,273,167 B2
(45) Date of Patent: *Mar. 1, 2016

(54) PROPYLENE COPOLYMER FOR INJECTION MOLDED ARTICLES OR FILMS

(71) Applicant: BOREALIS AG, Vienna (AT)

(72) Inventors: Martina Sandholzer, Linz (AT); Klaus Bernreitner, Linz (AT); Katja Klimke, Linz (AT); Markus Gahleitner, Neunhofen/Krems (AT)

(73) Assignee: Borealis AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/366,185

(22) PCT Filed: Dec. 18, 2012

(86) PCT No.: PCT/EP2012/076002
§ 371 (c)(1),
(2) Date: Jun. 17, 2014

(87) PCT Pub. No.: WO2013/092620
PCT Pub. Date: Jun. 27, 2013

(65) Prior Publication Data
US 2014/0316070 A1    Oct. 23, 2014

(30) Foreign Application Priority Data
Dec. 23, 2011   (EP) .................................... 11195493

(51) Int. Cl.
*C08F 210/06* (2006.01)
*C08J 5/18* (2006.01)
*C08L 23/14* (2006.01)

(52) U.S. Cl.
CPC ................ *C08F 210/06* (2013.01); *C08J 5/18* (2013.01); *C08L 23/14* (2013.01); *C08L 23/142* (2013.01); *C08J 2323/14* (2013.01)

(58) Field of Classification Search
CPC .... C08F 210/06; C08F 4/6545; C08F 210/16; C08F 2500/12; C08F 2500/17; C08F 2500/21; C08F 2500/26; C08J 5/18; C08J 2323/14; C08L 23/24; C08L 23/242; C08L 23/08

USPC .................................. 525/191, 240; 526/348
See application file for complete search history.

(56) References Cited

U.S. PATENT DOCUMENTS

| 8,680,207 B2 * | 3/2014 | Klimke et al. ................. 525/191 |
| 2015/0050442 A1 * | 2/2015 | Gahleitner et al. ......... 428/36.92 |
| 2015/0072095 A1 * | 3/2015 | Gahleitner et al. ......... 428/36.92 |

FOREIGN PATENT DOCUMENTS

| CN | 101035853 A | 9/2007 |
| CN | 101772541 A | 7/2010 |
| CN | 102076760 A | 5/2011 |
| EP | 0 491 566 A2 | 6/1992 |
| EP | 0 887 379 A1 | 12/1998 |
| EP | 2 154 195 A1 | 2/2010 |
| EP | 2 368 921 A1 | 9/2011 |
| WO | 87/07620 A1 | 12/1987 |
| WO | 92/12182 A1 | 7/1992 |
| WO | 92/19653 A1 | 11/1992 |
| WO | 92/19658 A1 | 11/1992 |
| WO | 99/24478 A1 | 5/1999 |
| WO | 99/24479 A1 | 5/1999 |
| WO | 00/68315 A1 | 11/2000 |
| WO | 04/000899 A1 | 12/2003 |
| WO | 2004/111095 A1 | 12/2004 |
| WO | 2008/141934 A1 | 11/2008 |
| WO | 2010/057916 A1 | 5/2010 |
| WO | 2010/111445 A1 | 9/2010 |
| WO | 2011/050926 A1 | 5/2011 |

OTHER PUBLICATIONS

"Ir-Spektroskopie fur Anwender"; Wiley-VCH, 1997.
"Validierung in der Analytik", Wiley-VCH, 1997.
European Search Report for Application No. EP 11 19 5493, Filed Dec. 23, 2011.
International Search Report for International Application No. PCT/EP2012/076002, Filed Dec. 18, 2012.

* cited by examiner

*Primary Examiner* — Nathan M Nutter
(74) *Attorney, Agent, or Firm* — Warn Partners, P.C.

(57) ABSTRACT

Propylene copolymer having a melt flow rate $MFR_2$ (230° C.) in the range of 2.5 to 12.0 g/10 min, a xylene cold soluble content (XCS) in the range of 20.0 to 45.0 wt.-%, a comonomer content in the range of more than 7.5 to 12.0 wt.-%, wherein further the comonomer content of xylene cold soluble (XCS) fraction of the propylene copolymer is in the range of 16.0 to 28.0 wt.-%.

15 Claims, No Drawings

PROPYLENE COPOLYMER FOR INJECTION MOLDED ARTICLES OR FILMS

CROSS REFERENCE TO RELATED APPLICATIONS

This application is a National Stage of International Application No. PCT/EP2012/076002, filed Dec. 18, 2012. This application claims priority to European Patent Application No. EP 11195493.9 filed on Dec. 23, 2011. The disclosures of the above applications are incorporated herein by reference.

The present invention is directed to a new soft propylene copolymer as well as to articles made therefrom.

Polymers are increasingly used in different demanding applications. At the same time there is a continuous seek for tailored polymers which meet the requirements of these applications. The demands can be challenging, since many polymer properties are directly or indirectly interrelated. For instance, heterophasic systems are known for its good impact behavior. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term inclusion indicates that the matrix and the inclusion form different phases within the heterophasic propylene copolymer, said inclusions are for instance visible by high resolution microscopy, like electron microscopy or scanning force microscopy.

A specific soft heterophasic propylene copolymer is described in WO 2008/141934 A1. This heterophasic propylene copolymer has a rather low melting temperature, which is detrimental in view of sterilization.

However in the field of packaging soft materials with good optical properties are required, which remain on a high level after sterilization.

Accordingly it is the object of the present invention to provide a soft heterophasic propylene copolymer with good optical properties in particular after sterilization. Further the heterophasic propylene copolymer shall show temperature resistance and good flowability.

The finding of the present invention is to provide a heterophasic propylene copolymer with rather high comonomer content and xylene cold soluble (XCS) content, wherein the xylene cold soluble fraction is featured by a high propylene content. Especially good results are achievable in case the intrinsic viscosity of the xylene cold soluble (XCS) is rather high.

Accordingly, the present invention is directed to a propylene copolymer having
(a) a melt flow rate $MFR_2$ (230° C.) measured according to ISO 1133 in the range of more than 2.5 to 12.0 g/10 min,
(b) a comonomer content in the range of more than 7.5 to 12.0 wt.-%, and
(c) a xylene cold soluble content (XCS) determined according ISO 16152 (25° C.) in the range of 20.0 to 45.0 wt.-%,
wherein further
the comonomer content of xylene cold soluble (XCS) fraction of the propylene copolymer is in the range of 16.0 to 28.0 wt.-%.

Preferably the xylene cold insoluble (XCI) fraction of the propylene copolymer has a comonomer content in the range of 1.5 to 6.0 wt.-% and/or the intrinsic viscosity (IV) of the xylene cold soluble (XCS) fraction of the propylene copolymer is at least 1.8 dl/g, more preferably in the range of equal or more than 1.8 to below 3.0 dl/g.

It has surprisingly been found that such propylene copolymer has a low flexural modulus, high impact strength and good optical properties before and after sterilization.

In the following the invention is defined in more detail.

The propylene copolymer comprises apart from propylene also comonomers. Preferably the propylene copolymer comprises apart from propylene ethylene and/or $C_4$ to $C_{12}$ α-olefins. Accordingly the term "propylene copolymer" according to this invention is understood as a polypropylene comprising, preferably consisting of, units derivable from
(a) propylene
and
(b) ethylene and/or $C_4$ to $C_{12}$ α-olefins.

Thus the propylene copolymer according to this invention comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene.

Preferably the propylene copolymer according to this invention comprises, especially consists of, monomers copolymerizable with propylene from the group consisting of ethylene, 1-butene and 1-hexene. More specifically the propylene copolymer of this invention comprises—apart from propylene—units derivable from ethylene and/or 1-butene. In a preferred embodiment the propylene copolymer according to this invention comprises units derivable from ethylene and propylene only.

Additionally it is appreciated that the propylene copolymer preferably has a rather high total comonomer content which contributes to the softness of the material. Thus it is required that the comonomer content of the propylene copolymer is at least 7.5 wt.-%, preferably in the range of 7.5 to 12.0 wt.-%, more preferably in the range of equal or above 8.0 to 11.0 wt.-%, like above 8.0 to 11.0 wt.-%, yet more preferably in the range of 8.2 to 10.5 wt.-%.

The propylene copolymer of the instant invention can be further defined by the amount of comonomers within the xylene cold soluble (XCS) fraction. Accordingly it is preferred that the comonomer content in the xylene cold soluble fraction (XCS) of the propylene copolymer is rather moderate. Thus it is appreciated that the comonomer content of the xylene cold soluble fraction (XCS) of the propylene copolymer is in the range of 16.0 to 28.0 wt.-%, yet more preferably in the range of 18.0 to 26.0 wt.-%, still more preferably in the range of 19.0 to 25.0 wt.-%, still yet more preferably in the range of 20.0 to 24.0 wt.-%.

Concerning the comonomers present in the xylene cold soluble fraction (XCS) it is referred to the information provided for the propylene copolymer. Accordingly in a specific embodiment the xylene cold soluble fraction (XCS) comprises, especially consists of, monomers copolymerizable with propylene from the group consisting of ethylene, 1-butene and 1-hexene. More specifically the xylene cold soluble fraction (XCS) comprises—apart from propylene—units derivable from ethylene and/or 1-butene. In a preferred embodiment the xylene cold soluble fraction (XCS) comprises units derivable from ethylene and propylene only.

Considering the information provided above, it is preferred that the propylene copolymer fulfills inequation (I), more preferably inequation (Ia), yet more preferably inequation (Ib), still more preferably inequation (Ic), $$\frac{Co(\text{total})}{Co(XCS)} \le 0.70, \tag{I}$$

-continued $$\frac{Co(\text{total})}{Co(XCS)} \leq 0.60, \quad \text{(Ia)}$$

$$0.30 \leq \frac{Co(\text{total})}{Co(XCS)} \leq 0.70, \quad \text{(Ib)}$$

$$0.35 \leq \frac{Co(\text{total})}{Co(XCS)} \leq 0.60, \quad \text{(Ic)}$$

wherein

Co (total) is the comonomer content [wt.-%] of the propylene copolymer

Co (XCS) is the comonomer content [wt.-%] of the xylene cold soluble fraction (XCS) of the propylene copolymer.

In a further preferred embodiment the propylene copolymer is additionally or alternatively defined by the rather overall comonomer content to its xylene cold soluble (XCS) fraction. Accordingly it is preferred that the propylene copolymer fulfills inequation (II), more preferably inequation (IIa), yet more preferably inequation (IIb), $$\frac{Co(\text{total})}{XCS} \leq 0.35 \quad \text{(II)}$$

$$0.22 \leq \frac{Co(\text{total})}{Co(XCS)} \leq 0.33, \quad \text{(IIa)}$$

$$0.25 \leq \frac{Co(\text{total})}{Co(XCS)} \leq 0.30, \quad \text{(IIb)}$$

wherein

Co (total) is the comonomer content [wt.-%] of the propylene copolymer,

XCS is the content of the xylene cold soluble fraction (XCS) [wt.-%] of the propylene copolymer.

Further it is appreciated that the xylene cold soluble (XCS) fraction of the propylene copolymer is specified by its intrinsic viscosity. A low intrinsic viscosity (IV) value reflects a low weight average molecular weight. For the present invention it is preferably required that the xylene cold soluble fraction (XCS) of propylene copolymer has an intrinsic viscosity (IV) measured according to ISO 1628/1 (at 135° C. in decalin) of equal or above 1.8 dl/g, more preferably of in the range of 1.8 to below 3.0 dl/g, still more preferably in the range of 1.8 to 2.7 dl/g, like in the range of 1.9 to 2.6 dl/g.

Additionally it is appreciated that the propylene copolymer has a xylene cold soluble fraction in the range of 20 to 45 wt.-%, more preferably in the range of 23 to 40 wt.-%, still yet more preferably in the range of 25 to 39 wt.-%. The remaining part of the propylene copolymer being not soluble in cold xylene is the cold insoluble fraction (XCI) which is further defined below.

Accordingly it is preferred that the comonomer content in the cold insoluble fraction (XCI) of the propylene copolymer is in the range of 1.5 to 6.0 wt.-%, yet more preferably in the range of 2.0 to 5.5 wt.-%, still more preferably in the range of 2.5 to 5.5 wt.-%, still yet more preferably in the range of 3.0 to 5.0 wt.-%.

In one preferred embodiment the molecular weight distribution (MWD) of the cold insoluble fraction (XCI) of the propylene copolymer is in the range of 3.0 to 6.0, more preferably in the range of 3.5 to 5.7, like in the range of 3.7 to 5.5.

Further it is appreciated that the xylene cold insoluble fraction (XCI) of propylene copolymer has an intrinsic viscosity (IV) measured according to ISO 1628/1 (at 135° C. in decalin) of equal or above 1.8 dl/g, more preferably of in the range of 1.8 to below 3.0 dl/g, still more preferably in the range of 1.8 to 2.7 dl/g, yet more preferably in the range of 1.9 to 2.6 dl/g, like in the range of 2.0 to 2.5 dl/g.

Also the properties between the xylene cold soluble (XCS) fraction and the xylene cold insoluble (XCI) fraction should be balanced.

Accordingly it is preferred the intrinsic viscosity in the xylene cold soluble (XCS) fraction and on the xylene cold insoluble (XCI) fraction are rather similar. Thus it is preferred that the propylene copolymer fulfills inequation (III) more preferably inequation (IIIa), yet more preferably inequation (IIIb), $$0.80 \leq \frac{IV(XCS)}{IV(XCI)} \leq 1.30 \quad \text{(III)}$$

$$0.85 \leq \frac{IV(XCS)}{IV(XCI)} \leq 1.25 \quad \text{(IIIa)}$$

$$0.90 \leq \frac{IV(XCS)}{IV(XCI)} \leq 1.20 \quad \text{(IIIb)}$$

wherein

IV (XCS) is the intrinsic viscosity (IV) [dl/g] of the xylene cold soluble (XCS) of the propylene copolymer, IV (XCI) is the intrinsic viscosity (IV) [dl/g] of the xylene cold insoluble (XCI) of the propylene copolymer.

Further it is preferred that the comonomer content in both fractions are in a specific ratio to each other. Accordingly it is preferred that the propylene copolymer fulfills inequation (IV) more preferably inequation (IVa), yet more preferably inequation (IVb), $$4.9 \leq \frac{Co(XCS)}{Co(XCI)} \leq 6.6 \quad \text{(IV)}$$

$$5.0 \leq \frac{Co(XCS)}{Co(XCI)} \leq 6.5 \quad \text{(IVa)}$$

$$5.1 \leq \frac{Co(XCS)}{Co(XCI)} \leq 6.3 \quad \text{(IVb)}$$

wherein

Co (XCS) is the comonomer content [wt.-%] of the xylene cold soluble (XCS) of the propylene copolymer, Co (XCI) is the comonomer content [wt.-%] of the xylene cold insoluble (XCI) of the propylene copolymer.

Preferably it is desired that the propylene copolymer is thermo mechanically stable, so that for instance a thermal sterilization process can be accomplished. Accordingly it is appreciated that the propylene copolymer has a melting temperature of at least 145° C., more preferably in the range of 145 to 160° C., still more preferably in the range of 150 to 159° C., like in the range of 150 to 158° C.

The propylene copolymer according to this invention can have a melt flow rate MFR$_2$ (230° C.) in the range of 2.5 to 12.0 g/10 min, more preferably in the range of 2.5 to 10.0 g/10 min, more preferably in the range of 2.5 to 8.5 g/10 min, still more preferably in the range of 2.5 to 5.0 g/10 min. In case the propylene copolymer is used as blown film material it has preferably a melt flow rate MFR$_2$ (230° C.) in the rage of 2.5 to 4.5 g/10 min, more preferably in the range of 3.0 to 4.0 g/10 min. In turn in case the propylene copolymer is used for cast film or injection moulding it is preferred that the melt flow rate $MFR_2$ (230° C.) is in the range of 3 to 12 g/10 min, like in the range of 4 to 10 g/10 min.

The instant propylene copolymer is especially further featured by its specific optical and mechanical properties.

Accordingly it is preferred that the propylene copolymer has a flexural modulus measured according to ISO 178 of not more than 600 MPa, more preferably in the range of 200 to 600 MPa, more preferably in the range of 250 to 550 MPa, most preferably in the range of 350 to 540 MPa.

In one preferred embodiment the propylene copolymer has a good impact behavior. Accordingly it is preferred that the propylene copolymer has
(a) an impact strength determined according to ISO 179/1 eA at 23° C. of at least 60.0 kJ/m$^2$, more preferably in the range of 60.0 to 95.0 kJ/m$^2$, yet more preferably in the range of 62.0 to 90.0 kJ/m$^2$,
and/or
(b) an impact strength determined according to ISO 179/1 eA at −20° C. of at least 4.5 kJ/m$^2$, more preferably in the range of 4.5 to 8.0 kJ/m$^2$, yet more preferably in the range of 4.6 to 7.5 kJ/m$^2$.

Additionally and/or alternatively the propylene copolymer preferably has
(a) a haze before sterilization determined according to ASTM D 1003-07 (60×60×1 mm$^3$ injection moulded plaques) of below 50%, more preferably 20 to 50%, yet more preferably 25 to below 50%,
and/or
(b) a haze after sterilization determined according to ASTM D 1003-07 (60×60×1 mm$^3$ injection moulded plaques) of below 65%, more preferably 25 to below 65%, yet more preferably 35 to 63%.
and/or
(c) a haze before sterilization determined according to ASTM D1003-00 (50 μm cast film) below 15%, more preferably 5 to below 15%, yet more preferably 6 to 12%,
and/or
(d) a haze after sterilization determined according to ASTM D 1003-00 (50 μm cast film) of below 20%, more preferably 8 to below 20%, yet more preferably 10 to 16%.

As indicated above, the instant propylene copolymer is featured by a rather high amount of a xylene cold soluble (XCS) fraction. On the other hand the propylene copolymer is also preferably featured by a rather high amount of a crystalline fraction melting at high temperature. Accordingly the instant propylene copolymer is a mixture of a crystalline polymer and amorphous material. Such type of polymer is classified as heterophasic propylene copolymer. A heterophasic propylene copolymer comprises a polymer matrix, like a (semi)crystalline polypropylene, in which the amorphous material, like an elastomeric propylene copolymer, is dispersed. Thus in a preferred embodiment the instant propylene copolymer is heterophasic propylene copolymer (RAHECO). More precisely the instant propylene copolymer is heterophasic propylene copolymer (RAHECO) comprising a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term "inclusion" according to this invention shall preferably indicate that the matrix and the inclusion form different phases within the heterophasic propylene copolymer (RAHECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably the heterophasic propylene copolymer (RAHECO) according to this invention comprises as polymer components only the random propylene copolymer (R-PP) and the elastomeric propylene copolymer (E). In other words the heterophasic propylene copolymer (RAHECO) may contain further additives but no other polymer in an amount exceeding 5 wt-%, more preferably exceeding 3 wt.-%, like exceeding 1 wt.-%, based on the total heterophasic propylene copolymer (RAHECO). One additional polymer which may be present in such low amounts is a polyethylene which is a by-reaction product obtained by the preparation of heterophasic propylene copolymer (RAHECO) (see in detail below). Accordingly it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

Preferably the weight ratio between the matrix (M), i.e. the random propylene copolymer (R-PP), and the elastomeric propylene copolymer (E) is 45/55 to 80/20, more preferably 50/50 to 75/25, yet more preferably 52/48 to 70/30.

In the following the random propylene copolymer (R-PP) and the elastomeric propylene copolymer (E) are defined more precisely.

The random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

The comonomer content of the random propylene copolymer (R-PP) is preferably in the range of 1.0 to 9.0 wt.-%, yet more preferably in the range of 1.5 to 8.0 wt.-%, still more preferably in the range of 1.5 to 7.5 wt.-%, like in the range of 2.0 to 7.0 wt.-%.

Further it is appreciated that the propylene copolymer fulfills inequation (V), more preferably inequation (Va), yet more preferably inequation (Vb), still more preferably inequation (Vc), still yet more preferably inequation (Vd), $$\frac{Co(\text{total})}{Co(RPP)} \geq 1.5, \tag{V}$$

$$\frac{Co(\text{total})}{Co(RPP)} \geq 1.8, \tag{Va}$$

$$5.0 \geq \frac{Co(\text{total})}{Co(RPP)} \geq 1.5, \tag{Vb}$$

$$4.5 \geq \frac{Co(\text{total})}{Co(RPP)} \geq 1.7, \tag{Vc}$$

$$4.4 \geq \frac{Co(\text{total})}{Co(RPP)} \geq 1.8, \tag{Vd}$$

wherein

Co (total) is the comonomer content [wt.-%] of the propylene copolymer,

Co (RPP) is the comonomer content [wt.-%] of the random propylene copolymer (R-PP).

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

The comonomer content of the matrix (M), i.e. of the random propylene copolymer (R-PP), has also impact on the amount of xylene cold solubles in the matrix (M). Thus it is preferred that the amount of the xylene cold soluble (XCS) fraction of the matrix (M), i.e. of the random propylene copolymer (R-PP), is preferably in the range of 3.5 to 15.0 wt.-%, still more preferably is in the range of 4.0 to 12.0 wt.-%.

The random propylene copolymer (R-PP) preferably comprises at least two polymer fractions, like two or three polymer fraction, all of them are propylene copolymers. Even more preferred the random propylene copolymer (R-PP) comprises, preferably consists of, a first propylene copolymer fraction (R-PP1) and a second propylene copolymer fraction (R-PP2). It is preferred that the first propylene copolymer fraction (R-PP1) is the comonomer lean fraction whereas the second propylene copolymer fraction (R-PP2) is the comonomer rich fraction.

Thus it is preferred that the first random propylene copolymer fraction (R-PP1) has a comonomer content of equal or below 5.0 wt.-%, more preferably of equal or below 4.0 wt.-%, yet more preferably in the range 0.5 to 5.0 wt.-%, still more preferably in the range 0.5 to 4.0 wt.-%, like in the range of 1.0 to 3.5 wt.-%.

As the comonomer of the first random propylene copolymer fraction (R-PP1) preferably is rather low, also its xylene cold soluble (XCS) is comparably low. Thus it is preferred that the amount of the xylene cold soluble (XCS) fraction of the first random propylene copolymer fraction (R-PP1) is equal or below than 12.0 wt.-%, more preferably is in the range of 3.0 to 12.0 wt.-%, still more preferably is in the range of 4.0 to 11.0 wt.-%, yet more preferably is in the range of 5.0 to 10.0 wt.-%, like in the range of 4.5 to 9.0 wt.-%. The xylene cold soluble (XCS) values provided in this paragraph are especially applicable before visbreaking as mentioned in detail below.

On the other hand the second random propylene copolymer fraction (R-PP2) preferably has a comonomer content of at least 0.5 wt.-%, more preferably in the range 0.5 to 20.0 wt.-%, still more preferably in the range 1.0 to 19.0 wt.-%, yet more preferably in the range 1.5 to 18.0 wt.-%.

The comonomers of the first random propylene copolymer fraction (R-PP1) and second random propylene copolymer fraction (R-PP2), respectively, copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the first random propylene copolymer fraction (R-PP1) and second random propylene copolymer fraction (R-PP2), respectively, comprise, especially consist of, monomers copolymerizable with propylene from the group consisting of ethylene, 1-butene and 1-hexene. More specifically the first random propylene copolymer fraction (R-PP1) and second random propylene copolymer fraction (R-PP2), respectively, comprise—apart from propylene— units derivable from ethylene and/or 1-butene. In a preferred embodiment the first random propylene copolymer fraction (R-PP1) and the second random propylene copolymer fraction (R-PP2) comprise the same comonomers, i.e. ethylene only.

Preferably the weight ratio between the first random propylene copolymer fraction (R-PP1) and the second random propylene copolymer fraction (R-PP2) is 20/80 to 80/20, more preferably 30/70 to 70/30.

As mentioned above a further component of the heterophasic propylene copolymer (RAHECO) is the elastomeric propylene copolymer (E) dispersed in the matrix (M), i.e. in the random propylene copolymer (R-PP). Concerning the comonomers used in the elastomeric propylene copolymer (E) it is referred to the information provided for the heterophasic propylene copolymer (RAHECO) and the random propylene copolymer (R-PP), respectively. Accordingly the elastomeric propylene copolymer (E) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer (E) comprises units derivable from ethylene and propylene only. It is especially preferred that the random propylene copolymer (R-PP) and the elastomeric propylene copolymer (E) comprises the same comonomers. Accordingly in one specific embodiment the random propylene copolymer (R-PP) and the elastomeric propylene copolymer (E) comprise propylene and ethylene only.

The comonomer content of the elastomeric propylene copolymer (E) preferably is not more than 30.0 wt.-%, more preferably not more than 25 wt.-%, still more preferably in the range of 14.0 to 26.0 wt.-%, yet more preferably in the range of 15.0 to 25.0 wt.-%.

The propylene copolymer, i.e. the heterophasic propylene copolymer (RAHECO), as defined in the instant invention may contain up to 1.0 wt.-% additives, like nucleating agents and antioxidants, as well as slip agents and antiblocking agents. Preferably the additive content is below 5.0 wt.-%, preferably below 3.0 wt.-%, like below 1.0 wt.-%.

The present invention is not only directed to the instant propylene copolymer, i.e. the heterophasic propylene copolymer (RAHECO), but also to films made therefrom.

One distinguishes between unoriented and oriented films (see for instance polypropylene handbook, Nello Pasquini, $2^{nd}$ edition, Hanser). Oriented films are typically biaxially oriented films, whereas unoriented films are cast or blown films. Accordingly an unoriented film is not drawn intensively in machine and transverse direction as done by oriented films. Thus the unoriented film according to this invention is not a biaxially oriented film. Preferably the unoriented film according to the instant invention is a blown film or cast film, the latter being preferred.

Accordingly in a further embodiment the present invention is directed to a film, preferably to an unoriented film, comprising at least 70 wt.-%, preferably comprising at least 80 wt.-%, more preferably comprising at least 90 wt.-%, still more preferably comprising at least 95 wt.-%, yet more preferably comprising at least 99 wt.-%, of the instant propylene copolymer, i.e. the heterophasic propylene copolymer (RAHECO). In one preferred embodiment the film, preferably the unoriented film, consists of the propylene copolymer, i.e. consists of the heterophasic propylene copolymer (RAHECO). This film may be a single layer film or may be a layer, more preferably a core layer, of a multi-layer film. Accordingly the term "film" covers also a layer of a mult-layer films.

In case the instant film is a layer of a multi-layer film, it is preferred that the multi-layer film comprises, preferably consist of, three layers, wherein the film of the present invention is preferably the core layer.

Preferably the film, i.e. the unoriented film, has a thickness of 5 to 2,000 µm, preferably of 10 to 1,000 µm, more preferably of 20 to 700 µm, like of 40 to 500 µm.

Typically such films, like multi-layer films, in particular three layer films, in which the instant film preferably is the core layer of the multi-layer films, are used as pouches and/or bags. Accordingly the present invention is also directed to pouches and bags made from the instant film.

In a further embodiment the present invention is also directed to injection molded articles comprising at least 70 wt.-%, preferably comprising at least 80 wt.-%, more preferably comprising at least 90 wt.-%, still more preferably comprising at least 95 wt.-%, yet more preferably comprising at least 99 wt.-%, of the instant propylene copolymer, i.e. the heterophasic propylene copolymer (RAHECO). In one preferred embodiment the injection molded articles consist of the propylene copolymer, i.e. consist of the heterophasic propylene copolymer (RAHECO). Typical articles are caps, closures, (small) syringes, (small) bottles, like bottles for powder and tablets.

The instant propylene copolymer, i.e. the heterophasic propylene copolymer (RAHECO), is preferably obtained by a specific process. Accordingly the instant propylene copolymer, i.e. the heterophasic propylene copolymer (RAHECO), is preferably obtained by a sequential polymerization process comprising the steps of (a) polymerizing in a first reactor (R1)
propylene and
ethylene and/or a C4 to C12 α-olefin, preferably ethylene, obtaining a first polymer fraction, i.e. a first random propylene copolymer fraction (R-PP1),
(b) transferring the first polymer fraction, i.e. the first random propylene copolymer fraction (R-PP1), into a second reactor (R2),
(c) polymerizing in said second reactor (R2) in the presence of the first polymer fraction, i.e. of the first random propylene copolymer fraction (R-PP1), propylene and
ethylene and/or a C4 to C12 α-olefin, preferably ethylene, obtaining a second polymer fraction, i.e. a second random propylene copolymer fraction (R-PP2), the first and second polymer fraction form a first mixture, i.e. the random propylene copolymer (R-PP),
(d) transferring said first mixture, the random propylene copolymer (R-PP), into a third reactor (R3),
(e) polymerizing in said third reactor (R3) in the presence of the first mixture, i.e. the random propylene copolymer (R-PP),
propylene and
ethylene and/or a C4 to C12 α-olefin, preferably ethylene, obtaining a third polymer fraction, said third polymer fraction is preferably the first fraction of the elastomeric propylene copolymer (E); the third polymer fraction and the first mixture, i.e. the random propylene copolymer (R-PP), form a second mixture,
(f) transferring said second mixture into a fourth reactor (R4),
(g) polymerizing in said forth reactor (R4) in the presence of the second mixture propylene and
ethylene and/or a C4 to C12 α-olefin, preferably ethylene, obtaining a forth polymer fraction, said forth polymer fraction is preferably the second fraction of the elastomeric propylene copolymer (E); the forth polymer fraction and the second mixture form the propylene copolymer, i.e. the heterophasic propylene copolymer (RAHECO),
(h) removing the propylene copolymer from the fourth reactor (R4), and
(i) optionally visbreaking said propylene copolymer, i.e. said heterophasic propylene copolymer (RAHECO).

Preferably between the second reactor (R2), the third reactor (R3) and the fourth reactor (R4) the monomers are flashed out.

The term "sequential polymerization process" indicates that the propylene copolymer, i.e. the heterophasic propylene copolymer (RAHECO), is produced in at least four reactors, preferably in four reactors, connected in series. Accordingly the present process comprises at least a first reactor (R1), a second reactor (R2), a third reactor (R3), and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

As stated above in the first two reactors the matrix (M), i.e. the random propylene copolymer (R-PP) is produced. More precisely, in the first reactor (R1) the first random propylene copolymer fraction (R-PP1) is produced whereas in the second reactor (R2) the second random propylene copolymer fraction (R-PP2).

The preferred comonomers used in the first reactor (R1) are the same as indicated above, for the first random propylene copolymer fraction (R-PP1). Accordingly especially preferred comonomers are ethylene, 1-butene and 1-hexene. In one specific embodiment the comonomer is ethylene.

Preferably the weight ratio between the first random propylene copolymer fraction (R-PP1) and the second random propylene copolymer fraction (R-PP2) is 20/80 to 80/20, more preferably 30/70 to 70/30.

Accordingly in the first reactor (R1) a first random propylene copolymer fraction (R-PP1) is produced having a comonomer content of equal or below 5.0 wt.-%, more preferably of equal or below 4.0 wt.-%, yet more preferably in the range 0.5 to 5.0 wt.-%, still more preferably in the range 0.5 to 4.0 wt.-%, like in the range of 1.0 to 3.5 wt.-%.

In the second rector (R2) the second random propylene copolymer fraction (R-PP2) is produced obtaining thereby the random propylene copolymer (R-PP).

The preferred comonomers used in the second reactor (R2) are the same as indicated above, for the first reactor (R1). Accordingly especially preferred comonomers are ethylene, 1-butene and 1-hexene. In one specific embodiment the comonomer is ethylene.

The second random propylene copolymer fraction (R-PP2) preferably has comonomer content of at least 0.5 wt.-%, more preferably in the range 0.5 to 20.0 wt.-%, still more preferably in the range 1.0 to 19.0 wt.-%, yet more preferably in the range 1.5 to 18.0 wt.-%.

Thus the overall comonomer content in the second reactor (R2), i.e. the comonomer content of the random propylene copolymer (R-PP), is preferably in the range of 1.0 to 9.0 wt.-%, yet more preferably in the range of 1.5 to 8.0 wt.-%, still more preferably in the range of 1.5 to 7.5 wt.-%, like in the range of 2.0 to 7.0 wt.-%.

The comonomers of the random propylene copolymer (R-PP), of the first random propylene copolymer fraction (R-PP1), and of the second random propylene copolymer fraction (R-PP2) copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP), the first random propylene copolymer fraction (R-PP1), and the second random propylene copolymer fraction (R-PP2) comprise, especially consist of, monomers copolymerizable with propylene from the group consisting of ethylene, 1-butene and 1-hexene. More specifically the random propylene copolymer (R-PP), the first random propylene copolymer fraction (R-PP1) and the second random propylene copolymer fraction (R-PP2) comprise—apart from propylene—units derivable from ethylene and/or 1-butene. In a preferred embodiment the random propylene copolymer (R-PP), the first random propylene copolymer fraction (R-PP1) and the second random propylene copolymer fraction (R-PP2) comprise the same comonomers, i.e. ethylene only.

Further the first random propylene copolymer fraction (R-PP1), i.e. the polymer of the first reactor (R1), has preferably a xylene cold soluble (XCS) fraction of equal or below than 12.0 wt.-%, more preferably in the range of 3.0 to 12.0 wt.-%, still more preferably in the range of 4.0 to 11.0 wt.-%, yet more preferably in the range of 5.0 to 10.0 wt.-%, still yet more preferably in the range of 4.5 to 9.0 wt.-%.

On the other hand the second random propylene copolymer fraction (R-PP2), i.e. the polymer produced in the second reactor (R2), preferably has a xylene cold soluble (XCS) fraction of below 40 wt.-%, more preferably in the range of 2 to 35 wt.-%, yet more preferably in the range of 3 to 30 wt.-%.

Accordingly the overall xylene cold soluble (XCS) content in the second reactor, i.e. the xylene cold soluble (XCS) fraction of the random propylene copolymer (R-PP), is preferably in the range of 3.5 to 15.0 wt.-%, still more preferably is in the range of 4.0 to 12.0 wt.-%.

Preferably the first random propylene copolymer fraction (R-PP1) preferably has a melt flow rate $MFR_2$ (230° C.) in the range of in the range of 0.5 to 3.0 g/10 min, more preferably in the range 1.0 to 3.0 g/10 min.

On the other hand the second random propylene copolymer fraction (R-PP2), i.e. the polymer produced in the second reactor (R2), preferably has a melt flow rate $MFR_2$ (230° C.) in the range of 0.4 to 3.0 g/10 min, more preferably in the range of 0.4 to 2.5 g/10 min.

Accordingly the overall melt flow rate $MFR_2$ (230° C.) in the second reactor, i.e. the melt flow rate $MFR_2$ (230° C.) of the random propylene copolymer (R-PP), preferably is in the range of 0.5 to 3.0 g/10 min, more preferably in the range 1.0 to 3.0 g/10 min.

Thus after the second reactor (R2) the matrix (M), i.e. the random propylene copolymer (R-PP), of the propylene copolymer, i.e. the heterophasic propylene copolymer (RAHECO), is obtained. This matrix (M) is subsequently transferred into the third reactor (R3) in which the first fraction of the elastomeric propylene copolymer (E) is produced (step (e)).

The preferred comonomers used in the third reactor (R3) are the same as indicated above, for the first reactor (R1). Accordingly especially preferred comonomers are ethylene, 1-butene and 1-hexene. In one specific embodiment the comonomer is ethylene.

The obtained second mixture comprises the matrix (M) in which the first fraction of the elastomeric propylene copolymer (E) is dispersed. Said second mixture has preferably a comonomer content which is higher than the comonomer content of the second reactor (R2). On the other hand the comonomer cotent should be not too high. Thus it is preferred that the comonomer content of the second mixture, i.e. after step (e)), is not more than 20.0 wt.-%, preferably in the range of 4.0 to 20.0 wt.-%, more preferably in the range of 5.0 to 18.0 wt.-%.

Another characteristic feature of the second mixture is its xylene cold soluble (XCS) content. Accordingly it is appreciated that the second mixture has xylene cold soluble (XCS) fraction of at least 22 wt.-%, more preferably of at least 25 wt.-%, still more preferably in the range of 22 to 50 wt.-%, yet more preferably in the range of 25 to 45 wt.-%, still yet more preferably in the range 27 to 42 wt.-%.

The comonomer content in the xylene cold soluble fraction (XCS) of the second mixture preferably is at least 16.0 wt.-%, more preferably in the range of 16.0 to 28.0 wt.-%, yet more preferably in the range of 18.0 to 26.0 wt.-%, still more preferably in the range of 20.0 to 25.0 wt.-%.

In step (f) the second mixture is transferred into the fourth reactor (R4). In the fourth reactor (R4) the second fraction of the elastomeric propylene copolymer (E) is produced (step (g)).

The preferred comonomers used in the fourth reactor (R4) are the same as indicated above for the first reactor (R1). Accordingly especially preferred comonomers are ethylene, 1-butene and 1-hexene. In one specific embodiment the comonomer is ethylene.

The so obtained polymer is the propylene copolymer, i.e. the heterophasic propylene copolymer (RAHECO), of the instant invention.

Preferably the heterophasic propylene copolymer (RAHECO) after step (g) has a melt flow rate $MFR_2$ (230° C.) in the range of 0.5 to 2.0 g/10 min, like 0.5 to 1.9 g/10 min.

It is preferred that the comonomer content of the xylene cold soluble fraction (XCS) after step (g), i.e. the comonomer content of the xylene cold soluble fraction (XCS) of the propylene copolymer, i.e. of the heterophasic propylene copolymer (RAHECO), is in the range of 16.0 to 28.0 wt.-%, yet more preferably in the range of 18.0 to 26.0 wt.-%, still more preferably in the range of 20.0 to 25.0 wt.-%.

The amount of xylene cold solubles (XCS) in the second mixture and in the propylene copolymer after step (g) is more or less the same. The same holds true for the intrinsic viscosities of the respective xylene cold soluble (XCS) fractions.

Accordingly the propylene copolymer, i.e. the heterophasic propylene copolymer (RAHECO), has xylene cold soluble (XCS) fraction of at least 25 wt.-%, more preferably in the range of 25 to 50 wt.-%, yet more preferably in the range of 25 to 45 wt.-%, still yet more preferably in the range 27 to 41 wt.-%.

Further the intrinsic viscosity (IV) measured according to ISO 1628/1 (at 135° C. in decalin) of the xylene cold soluble fraction (XCS) of propylene copolymer after step (g) preferably is of equal or below 3.7 dl/g, more preferably in the range of 1.6 to below 3.5 dl/g, still more preferably in the range of 1.8 to below 3.5 dl/g.

Concerning the melting temperature of the propylene copolymer, i.e. of the heterophasic propylene copolymer (RAHECO), after step (g) it is referred to the information provide above.

Preferably the weight ratio between the matrix (M), i.e. the random propylene copolymer (R-PP), after step (c) and the elastomeric propylene copolymer (E) produced in the steps (e) to (g) is 45/55 to 80/20, more preferably 50/50 to 75/25, yet more preferably 52/48 to 70/30.

After step (g) the propylene copolymer, i.e. the heterophasic propylene copolymer (RAHECO), can be optionally subjected a visbreaking step (step (i)) obtaining thereby a propylene copolymer, i.e. a heterophasic propylene copolymer (RAHECO), with enhanced melt flow rate. The visbreaking may be carried out in any known manner, but typically the present invention envisages chemical visbreaking using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis(tert.butylperoxy-isopropyl)benzene (DIPP) (for instance sold under the tradenames Perkadox 14S and Lupperox DC). Suitable amounts of peroxide to be employed in accordance with the present invention are in principle known to the skilled person and can easily be calculated on the basis of the amount of propylene copolymer of step (g) to be subjected to visbreaking, the $MFR_2$ (230° C.) value of the propylene copolymer of step (g) to be subjected to visbreaking and the desired target $MFR_2$ (230° C.) of the product to be obtained. Accordingly, typical amounts of peroxide visbreaking agent are from 0.005 to 0.5 wt.-%, more preferably from 0.005 to 0.2 wt.-%, based on the amount of propylene copolymer employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting in an overall decrease of the average molecular weight and an increase in melt flow rate.

Due to the visbreaking the melt flow rate, the amount of xylene cold solubles (XCS) and the intrinsic viscosity (IV) of the xylene cold soluble (XCS) fraction of the propylene copolymer, i.e. of the heterophasic propylene copolymer (RAHECO), are affected. On the other hand the melting temperature, the total comonomer content and the comonomer content of the xylene cold soluble (XCS) fraction of the propylene copolymer, i.e. of the heterophasic propylene copolymer (RAHECO), are not affected. Thus the non-visbroken propylene copolymer (after step (g)) and the visbroken propylene copolymer (after step (i)) have the same melting temperature, the same total comonomer content and the same comonomer content of the xylene cold soluble (XCS) fraction. Thus with regard to these embodiments reference is made to the information provided above.

The visbroken propylene copolymer preferably has a melt flow rate, a xylene cold soluble fraction (XCS) and an intrinsic viscosity (IV) as specified above for the propylene copolymer than the non visbroken propylene copolymer. Accordingly the propylene copolymer after step (i) preferably has a melt flow rate $MFR_2$ (230° C.) in the range of 2.5 to 12.0 g/10 min, more preferably in the range of 2.5 to 10.0 g/10 min, yet more preferably in the range of 2.5 to 8.5 g/10 min, like in the range of 2.5 to 5.0 g/10 min.

Further it is preferred that the xylene cold soluble fraction (XCS) of propylene copolymer after step (i) is in the range of 20 to 45 wt.-%, yet more preferably in the range of 23 to 40 wt.-%, still more preferably in the range of 25 to 39 wt.-%.

Preferably the xylene cold soluble fraction (XCS) of propylene copolymer after step (i) has an intrinsic viscosity (IV) measured according to ISO 1628/1 (at 135° C. in decalin) of equal or above 1.8 dl/g, more preferably of in the range of 1.8 to equal or below 3.0 dl/g, still more preferably in the range of 1.8 to 2.7 dl/g, yet more preferably in the range of 1.9 to 2.6 dl/g, like in the range of 2.0 to 2.5 dl/g.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3), and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2), third reactor (R3) and the fourth reactor (R4) are gas phase reactors (GPR). Accordingly for the instant process at least four, preferably four polymerization reactors, namely a slurry reactor (SR), like loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the propylene copolymer, i.e. the heterophasic propylene copolymer (RAHECO), as defined above the conditions for the first reactor (R1), i.e. the slurry reactor (SR), like a loop reactor (LR), of step (a) may be as follows:
- the temperature is within the range of 40° C. to 110° C., preferably between 60° C. and 100° C., like 68 to 90° C.,
- the pressure is within the range of 20 bar to 80 bar, preferably between 40 bar to 70 bar,
- hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
- the temperature is within the range of 50° C. to 130° C., preferably between 60° C. and 100° C.,
- the pressure is within the range of 5 bar to 50 bar, preferably between 15 bar to 35 bar,
- hydrogen can be added for controlling the molar mass in a manner known per se.

The condition in the third reactor (R3), preferably in the second gas phase reactor (GPR-2), and the fourth reactor (R4), preferably in the third gas phase reactor (GPR-3), are similar to the second reactor (R2).

The residence time can vary in the three reactor zones.

In one embodiment of the process for producing the propylene copolymer, i.e. the heterophasic propylene copolymer (RAHECO), the residence time the first reactor (R1), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (RAHECO) is obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIIa) or (Iamb), preferably represented by formula (IIIa).

The process runs especially efficient by using a Ziegler-Natta catalyst system, preferably by using a Ziegler-Natta catalyst system as defined herein detail below, and a specific comonomer/propylene ratio in the second reactor (R2) and/or in the third (R3) and forth reactor (R4), respectively. Accordingly it is preferred that (a) the comonomer/propylene ratio [Co/C3], like the ethylene/propylene ratio [C2/C3], in the second reactor (R2), i.e. in step (c), is in the range of 5 to 60 mol/kmol, more preferably in the range of 10 to 40 mol/kmol, and/or (b) the comonomer/propylene ratio [Co/C3], like the ethylene/propylene ratio [C2/C3], in the third reactor (R3), i.e. in step (e), is in the range of 160 to 200 mol/kmol, more preferably in the range of 170 to 190 mol/kmol, and/or (c) the comonomer/propylene ratio [Co/C3], like the ethylene/propylene ratio [C2/C3], in the fourth reactor (R4), i.e. in step (g), is in the range of 160 to 200 mol/kmol, more preferably in the range of 170 to 190 mol/kmol.

In the following the used catalyst is defined in more detail.

The procatalyst used according to the invention is prepared by a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

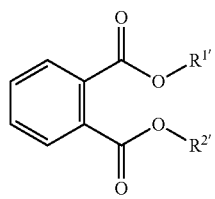

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl, and n is 1 to 6, is contacting with $TiCl_4$ to form a titanised carrier, followed by the steps of adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

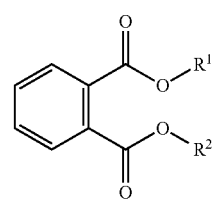

(II)

with $R^1$ and $R^2$ being methyl or ethyl, preferably ethyl,
the dialkylphthalat of formula (II) being the internal donor and
recovering said transesterification product as the procatalyst composition (component (i)).

The adduct of the formula $MgCl_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the propylene copolymer, i.e. the heterophasic propylene copolymer (RAHECO), according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by

$$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

$$Si(OCH_2CH_3)_3(NR^xR^y) \qquad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (IIIb) is diethylaminotriethoxysilane.

More preferably the external donor is selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof. Most preferably the external donor is dicyclopentyl dimethoxy silane [Si(OCH$_3$)$_2$(cyclo-pentyl)$_2$].

If desired the Ziegler-Natta procatalyst is modified by polymerizing a vinyl compound in the presence of the catalyst system, comprising the special Ziegler-Natta procatalyst (component (i)), the external donor (component (iii)) and optionally the cocatalyst (component (ii)), wherein the vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms. The so modified catalyst is used for the preparation of the propylene copolymer, i.e. of the heterophasic propylene copolymer (RAHECO), according to this invention.

The additives as stated above are added prior or after visbreaking to the propylene copolymer, i.e. to the heterophasic propylene copolymer (RAHECO). Preferably, these additives are mixed into the propylene copolymer, i.e. to the heterophasic propylene copolymer (RAHECO), prior to visbreaking. In another preferred embodiment the additives and the degrading agent (peroxide) are added in the same extrusion/mixing process, preferably into a co-rotating twin screw extruder as mentioned below.

For mixing, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then further processed, e.g. by injection molding or a film forming process as described below.

In case a film is produced it can be accomplished by cast film or blown film technology. In the cast film technology the molten propylene copolymer, i.e. the molten heterophasic propylene copolymer (RAHECO), is extruded through a slot extrusion die onto a chill roll to cool the polymer to a solid film. Typically propylene copolymer, i.e. the heterophasic propylene copolymer (RAHECO), is firstly compressed and liquefied in an extruder, it being possible for any additives to be already added to the polymer or introduced at this stage via a masterbatch. The melt is then forced through a flat-film die (slot die), and the extruded film is taken off on one or more take-off rolls, during which it cools and solidifies. It has proven particularly favorable to keep the take-off roll or rolls, by means of which the extruded film is cooled and solidified, at a temperature from 10 to 50° C., preferably from 10 to 0° C., more preferably from 12 to 35° C. The obtained product is an unstretched film which can if desired biaxially stretched.

In the blown film process the propylene copolymer, i.e. the heterophasic propylene copolymer (RAHECO), melt is extruded through an annular die and blown into a tubular film by forming a bubble which is collapsed between nip rollers after solidification. The blown extrusion can be preferably effected at a temperature in the range 160 to 240° C., and cooled by water or preferably by blowing gas (generally air) at a temperature of 10 to 50° C. to provide a frost line height of 0.5 to 8 times the diameter of the die. The blow up ratio should generally be in the range of from 1.5 to 4, such as from 2 to 4, preferably 2.5 to 3.5.

The preparation of injection molded articles is in the knowledge of a skilled person. Reference is made in particular to the "propylene handbook", Pasquini (Ed), 2$^{nd}$ edition, Hanser.

In the following the present invention is further illustrated by means of examples.

EXAMPLES

1. Measuring Methods

The following definitions of terms and determination methods apply for the above general description of the invention as well as to the below examples unless otherwise defined.

Calculation of comonomer content of the second propylene copolymer fraction (R-PP2):

$$\frac{C(PP) - w(PP1) \times C(PP1)}{w(PP2)} = C(PP2) \quad (I)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
C(PP1) is the comonomer content [in wt.-%] of the first propylene copolymer fraction (R-PP1),
C(PP) is the comonomer content [in wt.-%] of the random propylene copolymer (R-PP),
C(PP2) is the calculated comonomer content [in wt.-%] of the second propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \quad (II)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
XS(PP1) is the xylene cold soluble (XCS) content [in wt.-%] of the first propylene copolymer fraction (R-PP1),
XS(PP) is the xylene cold soluble (XCS) content [in wt.-%] of the random propylene copolymer (R-PP),
XS(PP2) is the calculated xylene cold soluble (XCS) content [in wt.-%] of the second propylene copolymer fraction (R-PP2), respectively.

Calculation of melt flow rate MFR$_2$ (230° C.) of the second propylene copolymer fraction (R-PP2):

$$MFR(PP2) = 10^{\left[\frac{\log(MFR(PP)) - w(PP1) \times \log(MFR(PP1))}{w(PP2)}\right]} \quad (III)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
MFR(PP1) is the melt flow rate MFR$_2$ (230° C.) [in g/10 min] of the first propylene copolymer fraction (R-PP1),
MFR(PP) is the melt flow rate MFR$_2$ (230° C.) [in g/10 min] of the random propylene copolymer (R-PP),
MFR(PP2) is the calculated melt flow rate MFR$_2$ (230° C.) [in g/10 min] of the second propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad (IV)$$

wherein
w(PP) is the weight fraction [in wt.-%] of the random propylene copolymer (R-PP), i.e. polymer produced in the first and second reactor (R1+R2),
w(E) is the weight fraction [in wt.-%] of the elastomeric propylene copolymer (E), i.e. polymer produced in the third and fourth reactor (R3+R4)
C(PP) is the comonomer content [in wt.-%] of the random propylene copolymer (R-PP), i.e. comonomer content [in wt.-%] of the polymer produced in the first and second reactor (R1+R2),
C(RAHECO) is the comonomer content [in wt.-%] of the propylene copolymer, i.e. is the comonomer content [in wt.-%] of the polymer obtained after polymerization in the fourth reactor (R4),
C(E) is the calculated comonomer content [in wt.-%] of elastomeric propylene copolymer (E), i.e. of the polymer produced in the third and fourth reactor (R3+R4).

MFR$_2$ (230° C.) is measured according to ISO 1133 (230° C., 2.16 kg load).

Number average molecular weight ($M_n$), weight average molecular weight ($M_w$) and molecular weight distribution (MWD)
are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Comonomer content, especially ethylene content is measured with Fourier transform infrared spectroscopy (FTIR) calibrated with $^{13}$C-NMR. When measuring the ethylene content in polypropylene, a thin film of the sample (thickness about 250 μm) was prepared by hot-pressing. The area of absorption peaks 720 and 733 cm$^{-1}$ for propylene-ethylene-copolymers was measured with Perkin Elmer FTIR 1600 spectrometer. Propylene-1-butene-copolymers were evaluated at 767 cm$^{-1}$. The method was calibrated by ethylene content data measured by $^{13}$C-NMR. See also "IR-Spektroskopie für Anwender"; WILEY-VCH, 1997 and "Validierung in der Analytik", WILEY-VCH, 1997

Flexural Modulus: The flexural modulus was determined in 3-point-bending at 23° C. according to ISO 178 on 80×10×4 mm³ test bars injection moulded in line with EN ISO 1873-2.

Charpy notched impact strength is determined according to ISO 179/1 eA at 23° C. and at −20° C. by using injection moulded specimens as described in EN ISO 1873-2 (80×10×4 mm).

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005, July 1. The part which remains insoluble is the xylene cold insoluble (XCI) fraction.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step Haze, transparency and clarity were determined according to ASTM D 1003-07 on 60×60×1 mm³ plaques injection moulded in line with EN ISO 1873-2 using a melt temperature of 200° C. Steam sterilization was performed as described below.

Haze, transparency and clarity were determined according to ASTM D1003-00 on cast films of 50 μm thickness produced on a monolayer cast film line with a melt temperature of 220° C. and a chill roll temperature of 15° C.

2. Examples

The catalyst used in the polymerization process for examples for examples E1 to E5 and CE1 to CE3 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As cocatalyst triethyl-aluminium (TEAL) and as donor dicyclo pentyl dimethoxy silane (D-donor) was used. The aluminium to donor ratio is indicated in tables 1(a) and 1(b).

The resulting polymers were visbroken in a co-rotating twin-screw extruder (type: Coperion ZSK 57) with suitable amounts of 2,5-dimethyl-2,5-di-(tert.butylperoxy)hexane (Trigonox® 101 supplied by AKZO Nobel, Netherlands) added to the extruder as concentrate of 1 wt.-% on polypropylene powder. As additives 0.04 wt. % synthetic hydrotalcite (DHT-4A supplied by Kisuma Chemicals, Netherlands) and 0.15 wt % Irganox B 215 (1:2-blend of Irganox 1010 (Pentaerythrityl-tetrakis(3-(3',5'-di-tert.butyl-4-hydroxytoluyl)-propionate and tris(2,4-di-t-butylphenyl)phosphate)phosphite) of BASF AG, Germany were added to the polymers in the same step.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

TABLE 1 (a)

Polymerization conditions (Comperative Examples)

| | | CE1 | CE2 | CE3 |
|---|---|---|---|---|
| TEAL/D | [mol/mol] | 15 | 15 | 15 |
| Loop | | | | |
| $MFR_2$ | [g/10 min] | 2.1 | 2.1 | 0.9 |
| C2 content | [wt.-%] | 1.7 | 1.8 | 2.1 |
| XCS | [wt.-%] | 5.1 | 5.5 | 5.0 |
| $H_2$/C3 ratio | [mol/kmol] | 1.5 | 1.6 | 0.7 |
| C2/C3 ratio | [mol/kmol] | 4.3 | 3.4 | 3.6 |
| 1 GPR | | | | |
| $MFR_2$ | [g/10 min] | 2.0 | 2.4 | 1.0 |
| C2 content | [wt.-%] | 2.0 | 2.1 | 4.9 |
| XCS | [wt.-%] | 5.1 | 5.0 | 4.7 |
| $H_2$/C3 ratio | [mol/kmol] | 19.4 | 27.7 | 11.9 |
| C2/C3 ratio | [mol/kmol] | 14.8 | 15.6 | 19.3 |
| 2 GPR | | | | |
| $MFR_2$ | [g/10 min] | 1.3 | 1.7 | 1.0 |
| C2 content | [wt.-%] | 7.4 | 9.9 | 12.3 |
| XCS | [wt.-%] | 19.8 | 28.4 | 34.7 |
| C2 of XCS | [wt.-%] | 30.0 | 28.0 | 29.0 |
| $H_2$/C3 ratio | [mol/kmol] | 90 | 197 | 344 |
| C2/C3 ratio | [mol/kmol] | 296 | 290 | 319 |
| 3 GPR | | | | |
| $MFR_2$ | [g/10 min] | 1.4 | 1.4 | 1.3 |
| C2 content | [wt.-%] | 9.4 | 11.7 | 13.6 |
| XCS | [wt.-%] | 26.0 | 35.0 | 37.0 |
| C2 of XCS | [wt.-%] | 29.0 | 29.0 | 30.0 |
| IV of XCS | [dl/g] | 3.4 | 2.0 | 2.1 |
| $H_2$/C3 ratio | [mol/kmol] | 95 | 192 | 358 |
| C2/C3 ratio | [mol/kmol] | 300 | 293 | 293 |
| Split | | | | |
| Loop | [wt.-%] | 38.1 | 30.2 | 25.1 |
| 1GPR | [wt.-%] | 34.1 | 34.3 | 35.9 |
| (2GPR + 3GPR) | [wt.-%] | 27.9 | 35.5 | 39.0 |
| Visbreaking | | | | |
| POX | [wt.-%] | 0.012 | 0.010 | 0.010 |
| $MFR_2$ | [g/10 min] | 3.9 | 4.0 | 3.6 |

TABLE 1 (b)

Polymerization conditions (Inventive Examples)

| | | E1 | E2 | E3 | E4 | E5 |
|---|---|---|---|---|---|---|
| TEAL/D | [mol/mol] | 15 | 15 | 15 | 15 | 15 |
| Loop | | | | | | |
| $MFR_2$ | [g/10 min] | 2.2 | 2.2 | 2.3 | 2.4 | 1.5 |
| C2 content | [wt.-%] | 2.0 | 2.1 | 2.4 | 1.9 | 2.4 |
| XCS | [wt.-%] | 5.1 | 6.2 | 6.8 | 6.8 | 6.8 |
| $H_2$/C3 ratio | [mol/kmol] | 1.5 | 1.6 | 1.6 | 1.5 | 0.9 |
| C2/C3 ratio | [mol/kmol] | 3.5 | 3.2 | 3.2 | 3.4 | 4.1 |
| 1 GPR | | | | | | |
| $MFR_2$ | [g/10 min] | 1.6 | 1.6 | 1.7 | 1.5 | 1.5 |
| C2 content | [wt.-%] | 3.8 | 3.2 | 3.2 | 3.0 | 2.4 |
| XCS | [wt.-%] | 9.6 | 7.5 | 7.5 | 8.0 | 4.9 |

TABLE 1 (b)-continued

Polymerization conditions (Inventive Examples)

|  |  | E1 | E2 | E3 | E4 | E5 |
|---|---|---|---|---|---|---|
| $H_2/C3$ ratio | [mol/kmol] | 19.2 | 19.7 | 17.7 | 20.1 | 13.4 |
| C2/C3 ratio | [mol/kmol] | 14.8 | 16.3 | 15.6 | 15.2 | 15.1 |
| 2 GPR |  |  |  |  |  |  |
| $MFR_2$ | [g/10 min] | 0.8 | 1.2 | 1.2 | 1.2 | 1.6 |
| C2 content | [wt.-%] | 8.4 | 8.8 | 10.0 | 10.0 | 8.9 |
| XCS | [wt.-%] | 30.2 | 28.3 | 35.6 | 37.4 | 33.9 |
| C2 of XCS | [wt.-%] | 22.0 | 22.0 | 21.5 | 22.0 | 21.0 |
| $H_2/C3$ ratio | [mol/kmol] | 92 | 205 | 222 | 214 | 461 |
| C2/C3 ratio | [mol/kmol] | 174 | 174 | 177 | 185 | 184 |
| 3 GPR |  |  |  |  |  |  |
| $MFR_2$ | [g/10min] | 1.1 | 1.4 | 1.5 | 1.6 | 1.7 |
| C2 content | [wt.-%] | 8.5 | 9.2 | 9.3 | 10.2 | 10.2 |
| XCS | [wt.-%] | 30.0 | 34.0 | 36.0 | 39.0 | 40.0 |
| C2 of XCS | [wt.-%] | 22.0 | 22.0 | 22.0 | 22.0 | 21.0 |
| IV of XCS | [dl/g] | 3.5 | 3.0 | 3.0 | 3.0 | 1.9 |
| $H_2/C3$ ratio | [mol/kmol] | 105 | 219 | 223 | 222 | 425 |
| C2/C3 ratio | [mol/kmol] | 165 | 180 | 178 | 176 | 183 |
| Split |  |  |  |  |  |  |
| Loop | [wt.-%] | 28.6 | 26.7 | 26.6 | 24.5 | 23.9 |
| 1GPR | [wt.-%] | 34.6 | 38.2 | 36.3 | 31.9 | 28.7 |
| (2GPR + 3GPR) | [wt.-%] | 36.8 | 32.1 | 37.1 | 43.6 | 47.4 |
| Visbreaking |  |  |  |  |  |  |
| POX | [wt.-%] | 0.015 | 0.011 | 0.011 | 0.011 | 0.008 |
| $MFR_2$ | [g/10 min] | 3.9 | 4.0 | 3.8 | 3.7 | 3.9 |

| C2 | ethylene |
| IV | intrinsic viscosity |
| $H_2/C3$ | ratio hydrogen/propylene ratio |
| C2/C3 | ratio ethylene/propylene ratio |
| POX | 2,5-dimethyl-2,5-di-(tert. butylperoxy)hexane |
| 1/2/3 GPR | 1/2/3 gas phase reactor |
| Loop | Loop reactor |

TABLE 2 (a)

Properties (Comperative Examples) after vis-breaking

|  |  | CE1 | CE2 | CE3 |
|---|---|---|---|---|
| $MFR_2$ | [g/10 min] | 3.9 | 4.0 | 3.6 |
| C2 total | [wt.-%] | 9.4 | 11.8 | 13.3 |
| XCS | [wt.-%] | 25 | 32 | 37 |
| C2 of XCS | [wt.-%] | 25 | 25 | 26 |
| IV of XCS | [dl/g] | 2.2 | 2.1 | 1.8 |
| C2 of XCI | [wt.-%] | 5.2 | 4.5 | 5.5 |
| IV of XCI | [dl/g] | 2.0 | 2.0 | 2.2 |
| MWD of XCI | [—] | 4.8 | 4.7 | 4.7 |
| Flexural modulus | [MPa] | 719 | 550 | 483 |
| Impact strength (23° C.) | [kJ/m²] | 49 | 54 | 66 |
| Impact strength (−20° C.) | [kJ/m²] | 5.3 | 6.7 | 8.7 |
| Injection molded specimen (1 mm) |  |  |  |  |
| T (b.s) | [%] | — | 74 | 73 |
| H (b.s) | [%] | — | 76 | 47 |
| C (b.s) | [%] | — | 89 | 94 |
| T (a.s) | [%] | — | 69 | 68 |
| H (a.s) | [%] | — | 88 | 64 |
| C (a.s) | [%] | — | 83 | 83 |
| Film sample (50 μm) |  |  |  |  |
| T (b.s) | [%] | — | — | 94 |
| H (b.s) | [%] | — | — | 7 |
| C (b.s) | [%] | — | — | 81 |
| T (a.s) | [%] | — | — | 92 |
| H (a.s) | [%] | — | — | 13 |
| C (a.s) | [%] | — | — | 76 |

TABLE 2 (b)

Properties (Inventive Examples) after vis-breaking

|  |  | E1 | E2 | E3 | E4 | E5 |
|---|---|---|---|---|---|---|
| $MFR_2$ | [g/10 min] | 3.9 | 4.0 | 3.8 | 3.7 | 3.9 |
| C2 total | [wt.-%] | 8.5 | 9.2 | 9.5 | 10.1 | 10.2 |
| XCS | [wt.-%] | 29 | 33 | 33 | 36 | 36 |
| C2 of XCS | [wt.-%] | 22 | 22 | 22 | 22 | 22 |
| IV of XCS | [dl/g] | 2.4 | 2.2 | 2.3 | 2.2 | 2.0 |
| C2 of XCI | [wt.-%] | 3.7 | 3.6 | 4.2 | 4.1 | 3.9 |
| IV of XCI | [dl/g] | 2.0 | 2.0 | 2.0 | 2.0 | 2.1 |
| MWD of XCI | [—] | 4.3 | 4.3 | 4.4 | 4.5 | 5.1 |
| Flexural modulus | [MPa] | 533 | 491 | 464 | 413 | 396 |
| Impact strength (23° C.) | [kJ/m²] | 63 | 67 | 69 | 72 | 70 |
| Impact strength (−20° C.) | [kJ/m²] | 4.6 | 5.0 | 5.3 | 6.4 | 6.9 |
| Injection molded specimen (1 mm) |  |  |  |  |  |  |
| T (b.s) | [%] | — | — | — | 79 | 81 |
| H (b.s) | [%] | — | — | — | 47 | 34 |
| C (b.s) | [%] | — | — | — | 97 | 94 |
| T (a.s) | [%] | — | — | — | 74 | 75 |
| H (a.s) | [%] | — | — | — | 62 | 49 |
| C (a.s) | [%] | — | — | — | 94 | 92 |
| Film sample (50 μm) |  |  |  |  |  |  |
| T (b.s) | [%] | — | — | — | 94 | — |
| H (b.s) | [%] | — | — | — | 9 | — |
| C (b.s) | [%] | — | — | — | 80 | — |
| T (a.s) | [%] | — | — | — | 92 | — |
| H (a.s) | [%] | — | — | — | 14 | — |
| C (a.s) | [%] | — | — | — | 75 | — |

| C2 | ethylene |
| XCS | xylene cold soluble fraction |

TABLE 2 (b)-continued

Properties (Inventive Examples) after vis-breaking

| | | E1 | E2 | E3 | E4 | E5 |
|---|---|---|---|---|---|---|

| XCI | xylene cold insoluble fraction |
| IV | intrinsic viscosity |
| H$_2$/C3 ratio | hydrogen/propylene ratio |
| C2/C3 ratio | ethylene/propylene ratio |
| POX | 2,5-dimethyl-2,5-di-(tert. butylperoxy)hexane |
| 1/2/3 GPR | 1/2/3 gas phase reactor |
| Loop | Loop reactor |
| T (b.s) | transperancy before sterilization |
| T (a.s) | transperancy after sterilization |
| H (b.s) | haze before sterilization |
| H (a.s) | haze after sterilization |
| C (b.s) | haze before sterilization |
| C (a.s) | haze after sterilization |

We claim:

1. Propylene copolymer comprising,
   (a) a melt flow rate MFR$_2$ (230° C.) measured according to ISO 1133 in the range of more than 2.5 to 12.0 g/10 min,
   (b) a comonomer content in the range of more than 7.5 to 12.0 wt.-%, and
   (c) a xylene cold soluble content (XCS) determined according ISO 16152 (25° C.) in the range of 20.0 to 45.0 wt.-%,
   wherein further
   the comonomer content of xylene cold soluble (XCS) fraction of the propylene copolymer is in the range of 16.0 to 28.0 wt.-%.

2. Propylene copolymer according to claim 1, wherein the propylene copolymer
   (a) has a melt flow rate MFR$_2$ (230° C.) measured according to ISO 1133 in the range of more than 2.5 to below 5.0 g/10min,
   and/or
   (b) fulfills inequation (I)

$$\frac{Co(\text{total})}{Co(XCS)} \leq 0.7$$

wherein
   Co (total) is the comonomer content [wt.-%] of the propylene copolymer,
   Co (XCS) is the comonomer content [wt.-%] of the xylene cold soluble fraction (XCS) of the propylene copolymer
   and/or
   (c) fulfills inequation (II)

$$\frac{Co(\text{total})}{XCS} \leq 0.35$$

wherein
   Co (total) is the comonomer content [wt.-%] of the propylene copolymer,
   XCS is the content of the xylene cold soluble fraction (XCS) [wt.-%] of the propylene copolymer.

3. Propylene copolymer according to claim 1, wherein the xylene cold insoluble (XCI) fraction of the propylene copolymer has
   (a) a comonomer content in the range of 1.5 to 6.0 wt.-%, and/or
   (b) molecular weight distribution (MWD) in the range of 3.0 to below 6.0.

4. Propylene copolymer according to claim 1, wherein the propylene copolymer has
   (a) an intrinsic viscosity (IV) of the xylene cold soluble (XCS) fraction in the range of equal or more than 1.8 to equal or below 3.0 dl/g,
   and/or
   (b) an intrinsic viscosity (IV) of the xylene cold insoluble (XCI) fraction in the range of equal or more than 1.8 to equal or below 2.7 dl/g,
   wherein the intrinsic viscosity (IV) is determined according to DIN ISO 1628/1, (in Decalin at 135° C.).

5. Propylene copolymer according to claim 1, wherein the propylene copolymer fulfills inequation (III)

$$0.80 \leq \frac{IV(XCS)}{IV(XCI)} \leq 1.30$$

wherein
   IV (XCS) is the intrinsic viscosity (IV) [dl/g] of the xylene cold soluble (XCS) of the propylene copolymer,
   IV (XCI) is the intrinsic viscosity (IV) [dl/g] of the xylene cold insoluble (XCI) of the propylene copolymer.

6. Propylene copolymer according to claim 1, wherein the propylene copolymer has
   (a) a melting temperature Tm determined by differential scanning calorimetry (DSC) in the range of 145 to 160° C.,
   and/or
   (b) a flexural modulus measured according to ISO 178 of below 600 MPa.

7. Propylene copolymer according to claim 1, wherein the propylene copolymer is a heterophasic propylene copolymer (RAHECO) comprising a matrix (M) and an elastomeric propylene copolymer (E) dispersed in said matrix (M), wherein said matrix (M) is a random propylene copolymer (R-PP).

8. Propylene copolymer according to claim 6, wherein the weight ratio between the matrix (M) and the elastomeric propylene copolymer (E) is 45/55 to 80/20.

9. Propylene copolymer according to claim 7, wherein the comonomer content of the random propylene copolymer (R-PP) is in the range of 1.0 to 9.0 wt.-%.

10. Propylene copolymer according to claim 7, wherein the propylene copolymer fulfills inequation (IV)

$$\frac{Co(\text{total})}{Co(RPP)} \geq 1.5$$

wherein

Co (total) is the comonomer content [wt.-%] of the propylene copolymer,

Co (RPP) is the comonomer content [wt.-%] of the random propylene copolymer (R-PP).

11. Propylene copolymer according to claim 7, wherein the random propylene copolymer (R-PP) has a xylene cold soluble (XCS) fraction in the range of 3.5 to 15.0 wt.-%.

12. Propylene copolymer according to claim 7, wherein the random propylene copolymer (R-PP) comprises at least two different fractions, a first random propylene copolymer fraction (R-PP1) and a second random propylene copolymer fraction (R-PP2), wherein further optionally
   (a) the weight ratio between the first random propylene copolymer fraction (R-PP1) and the second random propylene copolymer fraction (R-PP2) 20/80 to 80/20, and/or
   (b) the first random propylene copolymer fraction (R-PP1) has a comonomer content in the range 0.5 to 5.0 wt.-%, and/or
   (c) the second random propylene copolymer fraction (R-PP2) has a comonomer content in the range 0.5 to 20.0 wt.-%.

13. Propylene copolymer according to claim 7, wherein the elastomeric propylene copolymer (E) has a comonomer content in the range of 14.0 to 26.0 wt.-%.

14. Injection molded article comprising a propylene copolymer wherein said propylene copolymer comprisies,
   (a) a melt flow rate $MFR_2$ (230° C.) measured according to ISO 1133 in the range of more than 2.5 to 12.0 g/10min,
   (b) a comonomer content in the range of more than 7.5 to 12.0 wt.-%, and
   (c) a xylene cold soluble content (XCS) determined according ISO 16152 (25° C.) in the range of 20.0 to 45.0 wt.-%,
   wherein further
   the comonomer content of xylene cold soluble (XCS) fraction of the propylene copolymer is in the range of 16.0 to 28.0 wt.-%.

15. Film comprising a propylene copolymer, wherein said propylene copolymer comprises,
   (a) a melt flow rate $MFR_2$ (230° C.) measured according to ISO 1133 in the range of more than 2.5 to 12.0 g/10min,
   (b) a comonomer content in the range of more than 7.5 to 12.0 wt.-%, and
   (c) a xylene cold soluble content (XCS) determined according ISO 16152 (25° C.) in the range of 20.0 to 45.0 wt.-%,
   wherein further
   the comonomer content of xylene cold soluble (XCS) fraction of the propylene copolymer is in the range of 16.0 to 28.0 wt.-%.

* * * * *